United States Patent
Willey

Patent Number: 6,041,241
Date of Patent: Mar. 21, 2000

[54] APPARATUS AND METHOD FOR BALANCING POWER SAVINGS AND CALL SET UP TIME IN A WIRELESS COMMUNICATION DEVICE

[75] Inventor: William Daniel Willey, Arlington Heights, Ill.

[73] Assignee: Motorola, Inc., Schaumburg, Ill.

[21] Appl. No.: 08/810,718

[22] Filed: Mar. 3, 1997

[51] Int. Cl.[7] .................................................. H04B 1/38
[52] U.S. Cl. .......................... 455/574; 455/127; 370/311
[58] Field of Search ............................... 455/571, 572, 455/573, 574, 13.4, 127; 370/311, 310

[56] References Cited

U.S. PATENT DOCUMENTS

| | | | |
|---|---|---|---|
| 4,471,491 | 9/1984 | Mann et al. ............................. | 455/127 |
| 5,239,694 | 8/1993 | Toyoshima .............................. | 455/115 |
| 5,392,287 | 2/1995 | Tiedemann, Jr. et al. ............... | 455/343 |
| 5,570,369 | 10/1996 | Jokinen .................................. | 370/95.3 |
| 5,666,355 | 9/1997 | Huah et al. ............................. | 370/311 |
| 5,697,097 | 12/1997 | Reibel et al. ........................... | 455/343 |
| 5,710,975 | 1/1998 | Bernhardt et al. ...................... | 455/574 |
| 5,884,196 | 6/1996 | Lekven et al. .......................... | 455/574 |
| 5,910,944 | 2/1997 | Callicotte et al. ...................... | 370/311 |

OTHER PUBLICATIONS

*Qualcomm QCP–800 CDMA Portable Cellualar Phone User Guide*, Qualcomm, Inc., 1995.

Primary Examiner—Edward F. Urban
Assistant Examiner—Tilahun Gesesse
Attorney, Agent, or Firm—Donald C. Kordich; Lalita P. Williams

[57] ABSTRACT

A wireless communication device (100) comprises a battery (103) for providing power to the circuitry of wireless communication device (100). Optionally, power can be provided by an external power source, such as an automobile's cigarette lighter, via a plug (115). A power-availability circuit (101) determines an amount of available power from either source. A microprocessor (105) determines a new slot cycle index according to the amount of available power, and wireless communication device (100) is controlled according to the new slot cycle index.

4 Claims, 2 Drawing Sheets

APPARATUS AND METHOD FOR BALANCING POWER SAVINGS AND CALL SET UP TIME IN A WIRELESS COMMUNICATION DEVICE

FIELD OF THE INVENTION

The present invention relates generally to the field of digital communications, and more particularly to a method of balancing power savings in a wireless communication device and call set up time. Although the invention is subject to a wide range of applications, it is especially suited for use in wireless communication devices employed in a Code-Division Multiple Access (CDMA) system, and will be particularly described in that connection.

BACKGROUND OF THE INVENTION

Under the Interim Standard IS-95-A (IS-95-A), which has been adopted by the Telecommunications Industry Association for implementing CDMA cellular telephones systems and personal communication systems (PCS), pages are sent from a base station to a mobile station over a forward channel referred to as a Paging Channel. The page informs the mobile station that a call has been placed to it.

IS-95-A provides for a slotted mode feature, which allows a mobile station to operate in a reduced power mode. That is, the Paging Channel is divided into 80 millisecond (ms) intervals called paging channel slots, and each mobile station operating in the slotted mode is assigned a specific slot in which they monitor the Paging Channel. The assigned slot is periodic-called a slot cycle. Because the mobile station only needs to monitor the Paging Channel during its assigned slot, at all other times of the slot cycle the mobile station can "sleep," that is, go into the reduced power mode, for example, by turning off its radio-frequency (RF) portion. To monitor the next periodic slot, the mobile station must "wake up" from its sleep in time to monitor the Paging Channel during the assigned slot.

Under IS-95-A, the time between successive paging channel slots is governed by the equation $2^N \times 1.28$ seconds, where N is the slot cycle index that is an integer from 0 to 7, inclusive. Thus, for a slot cycle index of 7, the time between slots is 163.84 seconds. A mobile station can request a particular slot cycle index, and the infrastructure can use the particular slot cycle index for timing the transmission of paging channel messages to the mobile station during the assigned slot.

If the slot cycle index is large, the mobile station will be asleep for proportionately large periods of time. Thus, the mobile station's power consumption can be reduced and standby time increased by requesting and using a large slot cycle index. A large slot cycle index, however, results in excessive call setup times. In the worst case, a call originating party would be forced to wait more than 2.5 minutes before the mobile station started to ring. In such cases, the origination party is likely to hang-up before the call is set up.

A user of a mobile station typically would want to receive the call, and would not want to inconvenience the originating party by requiring the originating party to wait a relatively long time for a call to set up. Consequently, there is a tradeoff between the user's desire to save battery power and increase standby times and the practical consideration of receiving calls. A need therefore exists for a wireless communication device and method that balances power savings and call setup time.

DESCRIPTION OF THE PREFERRED EMBODIMENTS

Figure 1:
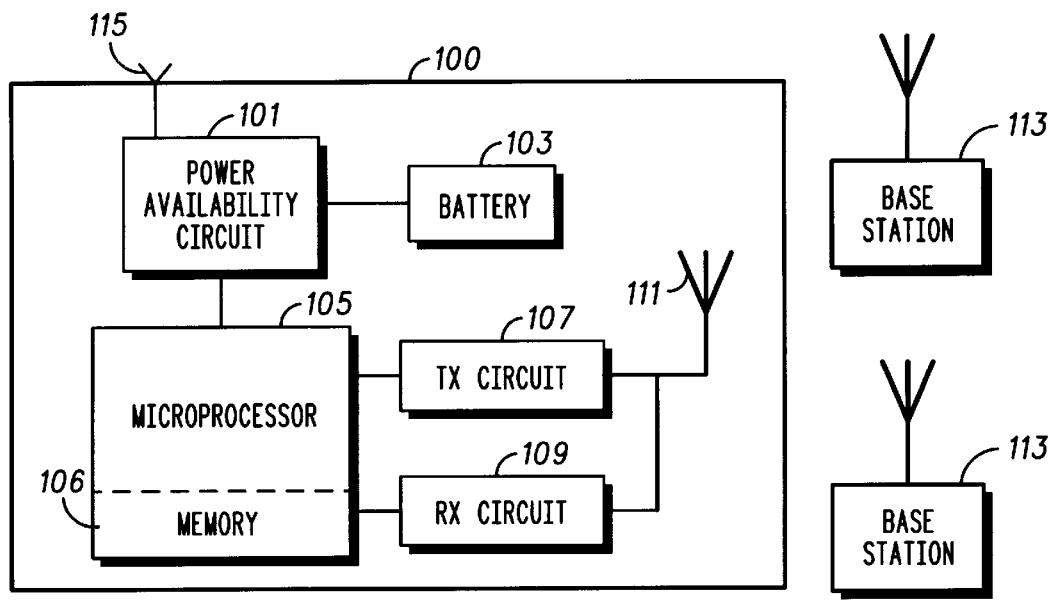
FIG. 1 is a simplified electrical block diagram of a wireless communication system.

The wireless communication device and method described herein provide advantages over known wireless communication devices and methods in that power savings is balanced against call setup time.

According to the present invention, the foregoing advantages are principally provided by a wireless communication device including a power availability circuit for determining an amount of power available to the wireless communication device, and a microprocessor that determines a new slot cycle index according to the amount of power available to the wireless communication device and that controls the wireless communication device according to the new slot cycle index.

In accordance with an aspect of the invention, the wireless communication device further includes a memory for storing a current slot cycle index, and the microprocessor determines if the new slot cycle index is different than the current slot cycle index. The microprocessor controls the wireless communication device according to the new slot cycle index if the new slot cycle index is different than the current slot cycle index and controls the wireless communication device according to the current slot cycle index if the new slot cycle index is not different than the current slot cycle index.

In accordance with another aspect of the invention, the wireless communication device further includes a battery that provides power to the wireless communication device, the power availability circuit includes a charge-level detection circuit that determines a charge level of the battery, and the microprocessor determines the new slot cycle index according to the charge level.

In accordance with another aspect of the invention, the wireless communication device further includes means for coupling an external power source to the wireless communication device, the power availability circuit comprises an external power detection circuit for determining the coupling of the external power source to the wireless communication device, wherein the microprocessor determines the new slot cycle index according to the coupling of the external power source.

In accordance with the method of this invention, the method includes the steps of determining an amount of power available to a wireless communication device, determining a new slot cycle index according to the amount of power available to a wireless communication device, and controlling the wireless communication device according to the new slot cycle index.

The method more particularly comprises the steps of determining if the new slot cycle index is different than a current slot cycle index, and executing the step of controlling the wireless communication device according to the new slot cycle index only if the new slot cycle index is different than the current slot cycle index.

In accordance with another aspect of the invention, the method comprises the step of powering the wireless communication device by a battery, wherein the step of determining an amount of available power includes the substep of determining a charge level of the battery, and wherein the new slot cycle index is determined according to the charge level.

In accordance with another aspect of the invention, the method comprises the step of coupling an external power source to the wireless communication device, wherein the step of determining an amount of available power includes the substep of determining the coupling of the external power source to the wireless communication device, and wherein the new slot cycle index is determined according to the coupling of the external power source to the wireless communication device.

Additional advantages and novel features of the invention will be set forth in part in the description which follows, wherein the preferred embodiments of the invention have been shown and described, and in part become apparent to those skilled in the art upon examination of the following detailed description or may be learned by practice of the invention. The invention is capable of other and different embodiments, and its several details are capable of modification, all without departing from the scope of the invention. The advantages of the invention may be realized and attained by means of the instrumentalities and combinations particularly pointed out in the appended claims.

Reference will now be made in detail to an embodiment configured according to the present invention.

FIG. 1 is a simplified electrical block diagram of a wireless communication system 10. In this particular embodiment, the system is CDMA capable. This figure illustrates, among other things a wireless communication device 100 that can wirelessly communicate with a plurality of base stations 113.

Wireless communication device 100 comprises a battery 103 for providing power to the circuitry of wireless communication device 100. Optionally, power can be provided by an external power source, such as an automobile's cigarette lighter, via a plug 115. One of ordinary skill can appreciate that there are other means of coupling an external power source, for example, through electromagnetic coupling. Wireless communication device 100 further comprises a power-availability circuit 101 that is coupled to battery 103 and plug 115. Power-availability circuit 101 determines an amount of power available to wireless communication device 100 from either source. For example, power-availability circuit 101 can include an external power source detector that determines that an external power source is coupled to the wireless communication device, or a charge-level detection circuit that determines the charge level of battery 103, or both. Power-availability circuit 101 is also coupled to a microprocessor 105.

A memory 106, which may be integral to microprocessor 105 or a separate element, stores a current slot cycle index. Microprocessor 105 controls the wireless communication device 100 according to the current slot cycle index, e.g., by turning off power to the RF portion of the wireless communication device between assigned slots and turning on a receiver circuit 109 during the assigned slot to monitor the Paging Channel and receive paging channel messages.

The RF portion of the wireless communication device includes a transmitter circuit 107 and receiver circuit 109, which are coupled between microprocessor 105 and an antenna 111 of the wireless communication device 100.

Microprocessor 105 receives an indication of the amount of available power, such as, unlimited power if the external power source is coupled with wireless communication device 100, or the charge level of the battery if there is no external power source coupled to the wireless communication device. Microprocessor 105 determines a new slot cycle index according to the amount of available power. For example, if the external power source is coupled to wireless communication device 100, power savings is not a concern, thus the new slot cycle index is zero. At this setting, call setup times are minimized. If there is no external power source, then the battery is supplying power; thus power savings is a concern, and the new slot cycle index is determined according to the charge level of the battery.

Figure 2:
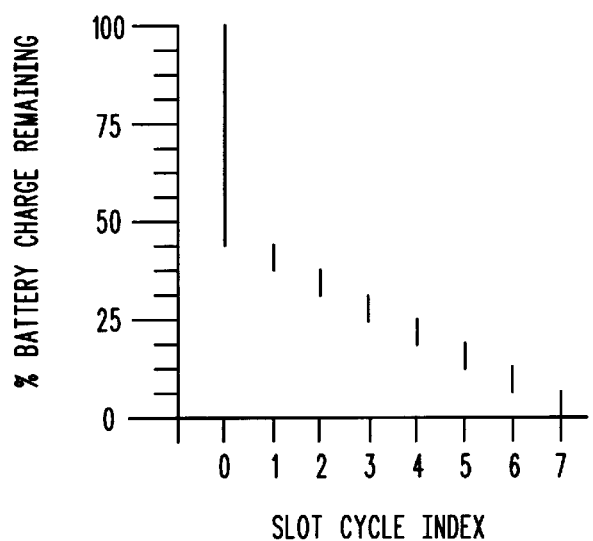
FIG. 2 is a graph illustrating an exemplary function for slot cycle index versus battery charge remaining.

FIG. 2 is a graph illustrating an exemplary function for determining the new slot cycle index according to battery charge level. For example, if the battery charge remaining is between approximately 44 percent and 100 percent of the battery charge remaining, then power saving is not paramount, and the new slot cycle index is determined as "0." Accordingly, call setup times are minimized. For each 6.25 percent decrease in charge level thereafter, the slot cycle index is increased by one, until "7" is chosen when the final 6.25 percent of the charge is available. Each increase in the slot cycle index corresponds to an increase in power savings, but also an increase in call setup time. A skilled artisan can appreciate that various functions of slot cycle index versus charge level can be substituted.

In addition, the slot cycle index can indicate that slotted mode will be bypassed. For example, a slot cycle index of "0" can be used to indicate that the slotted mode feature of the invention will be bypassed, while the other slot cycle index values indicate the corresponding slot cycles.

Microprocessor 105 can, if certain optional conditions are met, control wireless communication device 100 to receive according to the current slot cycle index. One way of doing this is to set the current slot cycle index to the new slot cycle index by writing over the stored slot cycle index in memory 106 with the new slot cycle index. Thereafter, microprocessor 105 will control receiver circuit 109 to monitor the Paging Channel and receive paging channel messages according to the current slot cycle index, which in some instances will be the newly determined slot cycle index.

Figure 3:
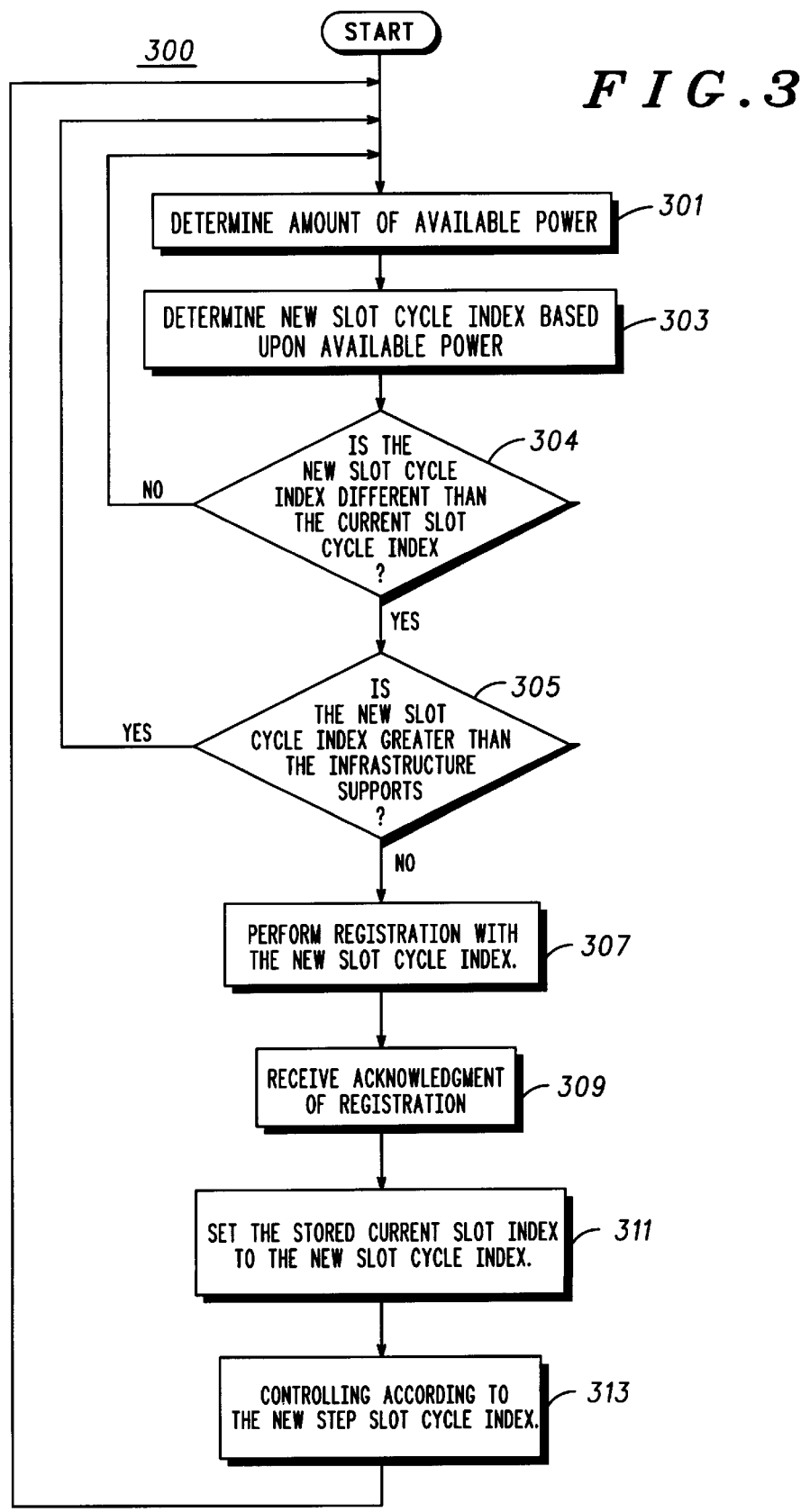
FIG. 3 is a flow chart illustrating a method performed by the wireless communication device shown in FIG. 1.

The method 300 of use and operation of the wireless communication device as constructed as described above will now be described with reference to FIG. 3.

Power-availability circuit 101 determines the amount of available power, for example, by determining the charge level of battery 103 or the coupling of an external power source. (Step 301.) Microprocessor 105 then determines the new slot cycle according to the amount of available power. (Step 303.)

In this particular embodiment, microprocessor 105 determines if certain optional conditions are met before controlling the wireless communication device according to the new slot cycle. For one, microprocessor 105 determines if the new slot cycle index is different than the current slot cycle index. (Step 304.) If not, then there is no reason to change the current slot cycle index. Accordingly, the steps of determining the amount of available power, determining the new slot cycle, and determining if the new slot cycle index is different than the current slot cycle index, are repeated until the new slot cycle index is different than the current slot cycle index.

The new slot cycle can be different from the current slot cycle for various reasons. For example, if the wireless communication device is powered by the battery, the battery can lose sufficient charge causing the new slot cycle index to be greater than the current slot cycle index; or, if the external power source is plugged in while the battery charge level is low, the amount of available power is unlimited, causing the new slot cycle index to be less than the current slot cycle index; or if a fully charged auxiliary battery is added to the main battery while the main battery charge level is low, the amount of available power is increased, causing the new slot cycle index to be less than the current slot cycle index.

Another optional condition is for microprocessor 105 to determine if the new slot cycle index is greater than a maximum slot cycle index, for example, the maximum slot cycle index that the infrastructure supports. (Step 305.) If the new slot cycle index is greater than the maximum slot cycle index, then the current slot cycle index should continue to be used to control wireless communication device 100. Consequently, the steps of determining the available power, determining the new slot cycle, determining if the new slot cycle index is different than the current slot cycle index, and determining if the new slot cycle index is greater than the maximum slot cycle index, are repeated.

If the optional conditions are met, then wireless communication device 100 registers the new slot cycle index with the infrastructure. (Step 307.) Optionally, before registering, as a substep of step 307, the user can be prompted to approve of the registration of the new slot cycle index. If the user chooses not to approve, for example, because receiving a call is more important than battery savings, the registration will not occur. If registration is approved and achieved, after receiving acknowledgment of registration, (step 309), microprocessor 105 sets the stored current slot cycle index to the new slot cycle index by writing over the stored current slot cycle index in memory 106. (Step 311.) Consequently, wireless communication device 100 will be controlled according to the newly stored slot cycle index. (Step 313.)

Those skilled in the art will recognize that various modifications and variations can be made in the wireless communication device and method of the present invention and in construction of this wireless communication device without departing from the scope or spirit of this invention.

In summary, the wireless communication device 100 configured in accordance with the present invention and method therefore determines a new slot cycle index according to the amount of available power, and provides the advantages of balancing power savings and call setup time.

What is claimed is:

1. A wireless communication device comprising:
   a power availability circuit for determining an amount of power available to the wireless communication device;
   a battery for providing power to the wireless communication device;
   a microprocessor for determining a new slot cycle index according to the amount of power available to the wireless communication device and for controlling the wireless communication device according to the new slot cycle index;
   wherein the power availability circuit comprises a charge level detection circuit for determining a charge level of the battery, and wherein the microprocessor determines the new slot cycle index according to the charge level.

2. A method of balancing power savings and call setup time, the method comprising the steps of:
   a) determining an amount of power available to a wireless communication device;
   b) determining a new slot cycle index according to the amount of Dower available to the wireless communication device;
   c) determining if the new slot cycle index is different than a current slot cycle index; and
   d) if the new slot cycle index is different than the current slot cycle index, controlling the wireless communication device according to the new slot cycle index.

3. A method of balancing power savings and call setup time comprising the steps of:
   a) determining an amount of power available to a wireless communication device;
   b) determining a new slot cycle index according to the amount of power available to the wireless communication device;
   c) determining if the new slot cycle index is greater than a maximum slot cycle index; and
   d) if the new slot cycle index is not greater than the maximum slot cycle index, controlling the wireless communication device according to the new slot cycle index.

4. A method of balancing power savings in a wireless communication device powered by a battery and call setup time, the method comprising the steps of:
   a) storing a new slot cycle index
   b) determining a charge level of the battery;
   c) determining a new slot cycle index according to the charge level;
   d) determining if the new slot cycle index is greater than a current slot cycle index;
   e) repeating steps b), c), and d) if the new slot cycle index is not greater than the current slot cycle index;
   f) determining if the new slot cycle index is greater than a maximum slot cycle index if the new slot cycle index is greater than the current slot cycle index;
   g) repeating steps b) through f) if the new slot cycle index is greater than the maximum slot cycle index;
   h) registering the new slot cycle index with an infrastructure in communication with the wireless communication device if the new slot cycle index is not greater than the maximum slot cycle index;
   i) receiving acknowledgment of registration;
   j) setting the current set slot index to the new slot cycle index; and
   k) receiving according to the current slot cycle index.

* * * * *

UNITED STATES PATENT AND TRADEMARK OFFICE
CERTIFICATE OF CORRECTION

PATENT NO. : 6,041,241
DATED : March 21, 2000
INVENTOR(S) : Willey, William D.

It is certified that error appears in the above-indentified patent and that said Letters Patent is hereby corrected as shown below:

Claim 2, line 6:

Please replace "Dower" with --power--.

Signed and Sealed this

Eighth Day of May, 2001

*Attest:*

NICHOLAS P. GODICI

*Attesting Officer*      Acting Director of the United States Patent and Trademark Office